United States Patent
Aitken et al.

(10) Patent No.: US 11,247,934 B2
(45) Date of Patent: Feb. 15, 2022

(54) OPTICAL BOROALUMINATE GLASSES

(71) Applicant: Corning Incorporated, Corning, NY (US)

(72) Inventors: Bruce Gardiner Aitken, Corning, NY (US); Lina Ma, Corning, NY (US); John Christopher Mauro, Boalsburg, PA (US)

(73) Assignee: Corning Incorporated, Corning, NY (US)

( * ) Notice: Subject to any disclaimer, the term of this patent is extended or adjusted under 35 U.S.C. 154(b) by 385 days.

(21) Appl. No.: 16/243,506

(22) Filed: Jan. 9, 2019

(65) Prior Publication Data

US 2019/0218136 A1    Jul. 18, 2019

Related U.S. Application Data

(60) Provisional application No. 62/617,767, filed on Jan. 16, 2018.

(51) Int. Cl.
  *C03C 3/145* (2006.01)
  *C03C 3/15* (2006.01)
  *C03C 3/068* (2006.01)
  *C03C 3/064* (2006.01)
  *C03C 3/155* (2006.01)
  *C03C 13/04* (2006.01)

(52) U.S. Cl.
  CPC ............. *C03C 3/145* (2013.01); *C03C 3/064* (2013.01); *C03C 3/068* (2013.01); *C03C 3/15* (2013.01); *C03C 13/045* (2013.01); *C03C 13/048* (2013.01); *C03C 2213/00* (2013.01)

(58) Field of Classification Search
  CPC ........... C03C 3/15; C03C 3/125; C03C 3/145; C03C 3/155; C03C 3/064; C03C 3/066; C03C 3/068
  See application file for complete search history.

(56) References Cited

U.S. PATENT DOCUMENTS

| | | |
|---|---|---|
| 4,127,415 A | 11/1978 | Quackenbush et al. |
| 4,400,473 A | 8/1983 | Mennemann et al. |
| 5,648,302 A | 7/1997 | Brow et al. |
| 7,449,419 B2 | 11/2008 | Li |
| 9,575,248 B2 | 2/2017 | Carlie et al. |
| 2005/0107238 A1 | 5/2005 | Li |
| 2009/0314033 A1 | 12/2009 | Zou et al. |
| 2012/0132282 A1* | 5/2012 | Aitken .............. C03C 3/087 136/260 |

FOREIGN PATENT DOCUMENTS

WO    2012075002 A2    6/2012

OTHER PUBLICATIONS

International Search Report and Written Opinion PCT/US2019/013426 dated Apr. 11, 2019, 10 PGS.
Aitken et al; "Tm-Doped Alkaline Earth Aluminate Glass for Optical Amplification at 1460nm" Journal of Non-Crystalline Solids; 249 (2004) pp. 115-119.
Bunker et al; "Local Structure of Alkaline-Earth Boroaluminate Crystals and Glasses: II, 11B and 27Al MAS NMR Spectroscopy of Alkaline-Earth Boroaluminate Glasses"; J. Am. Ceram. Soc., 74 [6]; (1991) pp. 1430-1438.
Higby et al; "Glass Formation and Thermal Properties of Low-Silica Calsium Aluminosilicate Glasses"; Journal of Non-Crystalline Solids, 126 (1990) pp. 209-215.
Hirayama; "Properties of Aluminoborate Glasses of Group II Metal Oxides: I, Glass Formation and Thermal Expansion"; Journal of the American Ceramic Society; vol. 44, No. 12; (1961) pp. 602-606.
Lines et al; "Calcium Aluminate Glasses as Potential Ultralow-Loss Optical Materials at 1.5-1.9 um"; Journal of Non-Crystalline Solids, 107 (1989) pp. 251-260.
Sebdani et al; "Effect of Divalent Cations and SiO2 on the Crystallization Behavior of Calcium Aluminate Glasses"; Journal of Non-Crystalline Solids; 413 (2015) pp. 20-23.
Uhlmann et al; "Spectroscipic Properties of Rare-Earth-Doped Calcium-Aluminate-Based Glasses"; Journal of Non-Crystalline Solids; 178 (1994) pp. 15-22.
Xu et al; "Broadband Infrared Emission of Erbium-Thulium-Codoped Calcium Boroaluminate Glasses"; Appl. Phys. B; 99 (2010) pp. 263-270.

* cited by examiner

Primary Examiner — Elizabeth A. Bolden

(57) ABSTRACT

An optical boroaluminate glass article comprises: from greater than or equal to 10.0 mol % to less than or equal to 30.0 mol % $Al_2O_3$; from greater than or equal to 10.0 mol % to less than or equal to 55.0 mol % CaO; from greater than or equal to 10.0 mol % to less than or equal to 25.0 mol % $B_2O_3$; from greater than or equal to 0.0 mol % to less than or equal to 30.0 mol % $SiO_2$; and from greater than or equal to 1.0 mol % to less than or equal to 20.0 mol % refractive index raising components. The optical boroaluminate glass article has a refractive index of the glass article, measured at 589.3 nm, of greater than or equal to 1.62, and a density of less than or equal to 4.00 g/cm$^3$.

20 Claims, 1 Drawing Sheet

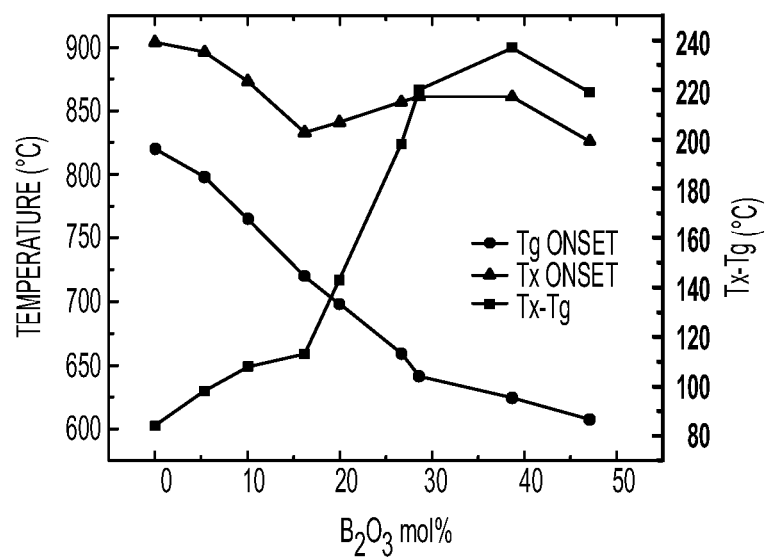

OPTICAL BOROALUMINATE GLASSES

This application claims the benefit of priority to U.S. Provisional Application Ser. No. 62/617,767 filed on Jan. 16, 2018, the content of which is relied upon and incorporated herein by reference in its entirety.

BACKGROUND

Field

The present specification generally relates to glass compositions suitable for use in optical displays, such as, for example, displays for augmented reality devices or virtual reality devices, optical fibers, and optical lenses. More specifically, the present specification is directed to boroaluminate glasses that may be used in displays for augmented reality devices or virtual reality devices.

Technical Background

In the recent decade, the demand of optical glasses with high refractive index (i.e., a refractive index (RI) >1.60) has increased with the growing market in augmented reality and virtual reality devices. Other requirements for these optical glasses used for augmented reality or virtual reality devices are good transmittance in visible range, good glass formability, chemical durability, and relatively low production cost. The manufacturing of glasses with high refractive index is quite different from the production of display glasses, which do not require such a high refractive index. Molding is the typical method used to prepare optical objects made of high RI glass, and usually, grinding and polishing are needed to achieve the desired surface properties of such optical objects, which may not be required in display glasses. Accordingly, the demands of high RI optical glasses are not the same as the demands of display glasses, and different glass compositions may be required for optical high RI glasses than for display glasses.

Another requirement of optical glasses for use in augmented reality or virtual reality devices is low density (i.e., density less than 4.00 g/cm$^3$). As many augmented reality or virtual reality devices are made as wearable devices, the weight of the device is held by a user. Over an extended period of time, even a relatively light weight device can become cumbersome to wear. Thus, light, low-density glasses are desirable for use as optical glasses in augmented reality or virtual reality devices.

In addition to high refractive index and low density, optical glasses for use in augmented reality or virtual reality devices may also have good chemical durability so that they can withstand cleaning and various environmental conditions, low thermal expansion to limit warping of the glass during formation, as well as other mechanical properties that may prevent the optical glass from becoming damaged during use in an augmented reality or virtual reality device.

Accordingly, a need exists for glasses that have the above-mentioned attributes and are suitable for use in an augmented reality or virtual reality device.

SUMMARY

According to a first embodiment, an optical boroaluminate glass article comprises: from greater than or equal to 10.0 mol % to less than or equal to 30.0 mol % $Al_2O_3$; from greater than or equal to 10.0 mol % to less than or equal to 55.0 mol % CaO; from greater than or equal to 10.0 mol % to less than or equal to 25.0 mol % $B_2O_3$; from greater than or equal to 0.0 mol % to less than or equal to 30.0 mol % $SiO_2$; and from greater than or equal to 1.0 mol % to less than or equal to 20.0 mol % refractive index raising components. The optical boroaluminate glass article has a refractive index of the glass article, measured at 589.3 nm, of greater than or equal to 1.62, and a density of less than or equal to 4.00 g/cm$^3$.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 graphically depicts the effects of $B_2O_3$ on the glass transition temperature and thermal stability against reheating according to embodiments disclosed and described herein.

DETAILED DESCRIPTION

Reference will now be made in detail to optical boroaluminate glasses according to various embodiments. Boroaluminate glass have many advantages over conventional silicate glasses, for example, good resistance to attack (corrosion) by alkali metals, relatively low maximum phonon energy (MOPE), such as, for example, about 800 cm$^{-1}$, significantly low scattering loss (e.g., Rayleigh scattering values), good infrared transmission, long wavelength cut-off, such as, for example, about 6 μm, and excellent mechanical properties, such as, for example tensile strength of about 90 MPa. Moreover, boroaluminate glasses are photosensitive to ultraviolet (UV) radiation and may be developed as photometric devices.

The structure and high fragility index (m), such as, for example m greater than 60, of boroaluminate glasses are also of fundamental interest. At the eutectic point of CaO—$Al_2O_3$ binary phase diagram (64CaO-36$Al_2O_3$, in mol %, CaO/$Al_2O_3$ ratio of about 1.78), the average Al coordination number is around 4.2, and thus $AlO_4$ tetrahedra are the main network former in the structure of calcium boroaluminate glasses. For some calcium boroaluminate glasses, the presence of five- and six-fold coordinated $Al^{3+}$ ions in the $Al_2O_3$-rich compositions is expect to lower the glass-forming ability.

The major limitations of boroaluminate glasses for various applications are their high liquidus temperature, such as, for example, greater than 1300° C., low liquidus viscosity, such as, for example, less than 15 poise, and thus strong tendency to devitrify. The low viscosity of non-silicate boroaluminate glasses compared to conventional silicate glasses limits their application for optical materials. The small addition of alkali oxide, alkaline earth, $SiO_2$ and $B_2O_3$ could greatly improve the glass forming ability and thermal stability of boroaluminate glasses but at the expense of optimal optical properties. The addition of $B_2O_3$ and $SiO_2$ into calcium boroaluminate glass can stabilize the glass structure and improve the glass thermal stability. It is believed that the introduction of a small amount of $SiO_2$, such as, for example, less than 15 mol %, into calcium boroaluminate glass increases $T_g$ and improves glassy network connectivity, and thus improves glass formation and stability. However, large amounts of $SiO_2$, such as, for example, greater than 30 mol %, or, in some embodiments, greater than 15 mol %, changes the main devitrification phase from $12CaO.7Al_2O_3$ to $2CaO.Al_2O_3.SiO_2$, and would decrease the glass thermal stability with large additions of $SiO_2$. The species of divalent cations also affect the crystallization behavior and thermal stability of boroaluminate glasses. Compared to the $CaO$—$Al_2O_3$ eutectic composition, the partial substitution of CaO for different modifier oxides (MgO, SrO, BaO and ZnO) improved the glass thermal stability shown by differential scanning calorimetry (DSC) and X-ray diffraction (XRD).

In embodiments of glass compositions described herein, the concentration of constituent components (e.g., $Al_2O_3$, $SiO_2$, $B_2O_3$, and the like) are given in mole percent (mol %) on an oxide basis, unless otherwise specified. Components of the optical boroaluminate glass composition according to embodiments are discussed individually below. It should be understood that any of the variously recited ranges of one component may be individually combined with any of the variously recited ranges for any other component.

In embodiments of the optical boroaluminate glass compositions disclosed herein, $Al_2O_3$ is the largest constituent and, as such, $Al_2O_3$ is the primary constituent of the glass network formed from the glass composition. $Al_2O_3$ may increase the viscosity of the glass composition due to its $AlO_4$ tetrahedral and/or $AlO_6$ octahedral coordinations in a glass melt formed from a glass composition, decreasing the formability of the glass composition when the amount of $Al_2O_3$ is too high. However, when the concentration of $Al_2O_3$ is balanced against the concentration of other glass network formers and the concentration of alkali oxides in the glass composition, $Al_2O_3$ can enhance the liquidus viscosity and improve the compatibility of the glass composition with certain forming processes. In embodiments, the glass composition generally comprises $Al_2O_3$ in a concentration of from greater than or equal to 10.0 mol % to less than or equal to 30.0 mol % and all ranges and sub-ranges between the foregoing values. In some embodiments, the glass composition comprises $Al_2O_3$ in amounts greater than or equal to 12.0 mol %, greater than or equal to 14.0 mol %, greater than or equal to 16.0 mol %, greater than or equal to 18.0 mol %, greater than or equal to 20.0 mol %, greater than or equal to 22.0 mol %, greater than or equal to 24.0 mol %, greater than or equal to 26.0 mol %, or greater than or equal to 28.0 mol %. In embodiments, the glass composition comprises $Al_2O_3$ in amounts less than or equal to 28.0 mol %, less than or equal to 26.0 mol %, less than or equal to 24.0 mol %, less than or equal to 22.0 mol %, less than or equal to 20.0 mol %, less than or equal to 18.0 mol %, less than or equal to 16.0 mol %, less than or equal to 14.0 mol %, or less than or equal to 12.0 mol %. It should be understood that, in embodiments, any of the above ranges may be combined with any other range. However, in other embodiments, the glass composition comprises $Al_2O_3$ in an amount from greater than or equal to 12.0 mol % to less than or equal to 28.0 mol %, such as from greater than or equal to 14.0 mol % to less than or equal to 26.0 mol %, from greater than or equal to 16.0 mol % to less than or equal to 24.0 mol %, or from greater than or equal to 18.0 mol % to less than or equal to 22.0 mol % and all ranges and sub-ranges between the foregoing values.

Like $Al_2O_3$, $B_2O_3$ may be added to the glass composition as a glass network former, thereby increasing or enhancing the meltability and formability of the glass composition. Similar to $Al_2O_3$, boron will be present primarily in its $BO_4$ tetrahedral form. Thus, $B_2O_3$ may be added in amounts that do not overly decrease these properties, and may improve the glass thermal stability. In embodiments, the glass composition may comprise $B_2O_3$ in amounts from greater than or equal to 10.0 mol % to less than or equal to 25.0 mol % and all ranges and sub-ranges between the foregoing values. In some embodiments, the glass composition comprises $B_2O_3$ in amounts greater than or equal to 12.0 mol %, greater than or equal to 14.0 mol %, greater than or equal to 16.0 mol %, greater than or equal to 18.0 mol %, greater than or equal to 20.0 mol %, greater than or equal to 22.0 mol %, or greater than or equal to 24.0 mol %. In embodiments, the glass composition comprises $B_2O_3$ in amounts less than or equal to 24.0 mol %, less than or equal to 22.0 mol %, less than or equal to 20.0 mol %, less than or equal to 18.0 mol %, less than or equal to 16.0 mol %, less than or equal to 14.0 mol %, or less than or equal to 12.0 mol %. It should be understood that, in embodiments, any of the above ranges may be combined with any other range. However, in some embodiments, the glass composition comprises $B_2O_3$ in an amount from greater than or equal to 12.0 mol % to less than or equal to 24.0 mol %, from greater than or equal to 14.0 mol % to less than or equal to 22.0 mol %, or from greater than or equal to 16.0 mol % to less than or equal to 20.0 mol % and all ranges and sub-ranges between the foregoing values.

In embodiments of the optical boroaluminate glass compositions disclosed herein, $SiO_2$ may be added as an additional glass network former. Pure $SiO_2$ has a relatively low CTE. However, pure $SiO_2$ has a high melting point. Thus, the addition of $SiO_2$ may increase glass thermal stability. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. In embodiments, the glass composition generally comprises $SiO_2$ in an amount from greater than or equal to 0.0 mol % to less than or equal to 30.0 mol % and all ranges and sub-ranges between the foregoing values. Preferably the amount of $SiO_2$ is greater than 0, for example greater than 0.1 mole %. In some embodiments, the glass composition comprises $SiO_2$ in amounts greater than or equal to 0.6 mol %, greater than or equal to 1.0 mol %, greater than or equal to 2.0 mol %, greater than or equal to 4.0 mol %, greater than or equal to 6.0 mol %, greater than or equal to 8.0 mol %, greater than or equal to 10.0 mol %, greater than or equal to 12.0 mol %, greater than or equal to 14.0 mol %, greater than or equal to 16.0 mol %, greater than or equal to 18.0 mol %, greater than or equal to 20.0 mol %, greater than or equal to 22.0 mol %, greater than or equal to 24.0 mol %, greater than or equal to 26.0 mol %, or greater than or equal to 28.0 mol %. In embodiments, the glass composition comprises $SiO_2$ in amounts less than or equal to 28.0 mol %, less than or equal to 26.0 mol %, less than or equal to 24.0 mol %, less than or equal to 22.0 mol %, less than or equal to 20.0 mol %, less than or equal to 18.0 mol %, less than or equal to 16.0 mol %, less than or equal to 14.0 mol %, less than or equal to 12.0 mol %, less than or equal to 10.0 mol %, less than or equal to 8.0 mol %, less than or equal to 6.0 mol %, less than or equal to 4.0 mol %, less than or equal to 2.0 mol %, less than or equal to 1.0 mol %, or less than or equal to 0.5 mol %. It should be understood that, in embodiments, any of the above ranges may be combined with any other range. However, in other embodiments, the glass composition comprises $SiO_2$ in an amount from greater than or equal to 0.5 mol % to less than or equal to 28.0 mol %, from greater than or equal to 1.0 mol % to less than or equal to 26.0 mol %, from greater than or equal to 2.0 mol % to less than or equal to 24.0 mol %, from greater than or equal to 4.0 mol % to less than or equal to 22.0 mol %, from greater than or equal to 6.0 mol % to less than or equal to 20.0 mol %, from greater than or equal to 8.0 mol % to less than or equal to 18.0 mol %, from greater than or equal to 10.0 mol % to less than or equal to 16.0 mol %, or from greater than or equal to 14.0 mol % to less than or equal to 16.0 mol % and all ranges and sub-ranges between the foregoing values.

In addition to glass network formers, the addition of CaO lowers the viscosity of a glass, which enhances the formability, the strain point and the Young's modulus. However, when too much CaO is added to the glass composition, the glass melts may crystallize and devitrify upon cooling. Other effects of CaO in the glass are discussed above. In embodiments, the glass composition generally comprises CaO in a concentration of from greater than or equal to 10.0 mol % to less than or equal to 55.0 mol % and all ranges and sub-ranges between the foregoing values. In some embodiments, the glass composition comprises CaO in amounts greater than or equal to 12.0 mol %, greater than or equal to 14.0 mol %, greater than or equal to 16.0 mol %, greater than or equal to 18.0 mol %, greater than or equal to 20.0 mol %, greater than or equal to 22.0 mol %, greater than or equal to 24.0 mol %, greater than or equal to 26.0 mol %, greater than or equal to 28.0 mol %, greater than or equal to 30.0 mol %, greater than or equal to 32.0 mol %, greater than or equal to 34.0 mol %, greater than or equal to 36.0 mol %, greater than or equal to 38.0 mol %, greater than or equal to 40.0 mol %, greater than or equal to 42.0 mol %, greater than or equal to 44.0 mol %, greater than or equal to 46.0 mol %, or greater than or equal to 48.0 mol %. In some embodiments, the glass composition comprises CaO in amounts less than or equal to 48.0 mol %, less than or equal to 46.0 mol %, less than or equal to 44.0 mol %, less than or equal to 42.0 mol %, less than or equal to 40.0 mol %, less than or equal to 38.0 mol %, less than or equal to 36.0 mol %, less than or equal to 34.0 mol %, less than or equal to 32.0 mol %, less than or equal to 30.0 mol %, less than or equal to 28.0 mol %, less than or equal to 26.0 mol %, less than or equal to 24.0 mol %, less than or equal to 22.0 mol %, less than or equal to 20.0 mol %, less than or equal to 18.0 mol %, less than or equal to 16.0 mol %, less than or equal to 14.0 mol %, or less than or equal to 12.0 mol %. It should be understood that, in embodiments, any of the above ranges may be combined with any other range. However, in some embodiments, the glass composition comprises CaO in an amount from greater than or equal to 12.0 mol % to less than or equal to 48.0 mol %, such as from greater than or equal to 14.0 mol % to less than or equal to 46.0 mol %, from greater than or equal to 16.0 mol % to less than or equal to 44.0 mol %, from greater than or equal to 18.0 mol % to less than or equal to 42.0 mol %, from greater than or equal to 20.0 mol % to less than or equal to 40.0 mol %, from greater than or equal to 22.0 mol % to less than or equal to 38.0 mol %, from greater than or equal to 24.0 mol % to less than or equal to 38.0 mol %, from greater than or equal to 26.0 mol % to less than or equal to 36.0 mol %, from greater than or equal to 28.0 mol % to less than or equal to 34.0 mol %, or from greater than or equal to 30.0 mol % to less than or equal to 32.0 mol % and all ranges and sub-ranges between the foregoing values.

BaO lowers the viscosity of a glass, which enhances the formability, the strain point and the Young's modulus, and may improve the RI of the glass. However, when too much BaO is added to the glass composition, the density and crystallization tendency of the glass composition increases. In embodiments, the glass composition generally comprises BaO in a concentration of from greater than or equal to 0.0 mol % to less than or equal to 25.0 mol % and all ranges and sub-ranges between the foregoing values. In some embodiments, the glass composition comprises BaO in amounts greater than or equal to 0.5 mol %, greater than or equal to 1.0 mol %, greater than or equal to 2.0 mol %, greater than or equal to 4.0 mol %, greater than or equal to 6.0 mol %, greater than or equal to 8.0 mol %, greater than or equal to 10.0 mol %, greater than or equal to 12.0 mol %, greater than or equal to 14.0 mol %, greater than or equal to 16.0 mol %, greater than or equal to 18.0 mol %, greater than or equal to 20.0 mol %, greater than or equal to 22.0 mol %, or greater than or equal to 24.0 mol %. In some embodiments, the glass composition comprises BaO in amounts less than or equal to 24.0 mol %, less than or equal to 22.0 mol %, less than or equal to 20.0 mol %, less than or equal to 18.0 mol %, less than or equal to 16.0 mol %, less than or equal to 14.0 mol % less than or equal to 12.0 mol %, less than or equal to 10.0 mol %, less than or equal to 8.0 mol %, less than or equal to 6.0 mol %, less than or equal to 4.0 mol %, less than or equal to 2.0 mol %, less than or equal to 1.0 mol %, or less than or equal to 0.5 mol %. It should be understood that, in embodiments, any of the above ranges may be combined with any other range. However, in other embodiments, the glass composition comprises BaO in an amount from greater than or equal to 0.5 mol % to less than or equal to 24.0 mol %, such as from greater than or equal to 1.0 mol % to less than or equal to 22.0 mol %, from greater than or equal to 2.0 mol % to less than or equal to 20.0 mol %, from greater than or equal to 4.0 mol % to less than or equal to 18.0 mol %, from greater than or equal to 6.0 mol % to less than or equal to 16.0 mol %, from greater than or equal to 8.0 mol % to less than or equal to 14.0 mol %, or from greater than or equal to 10.0 mol % to less than or equal to 12.0 mol % and all ranges and sub-ranges between the foregoing values.

SrO lowers the viscosity of a glass, which enhances the formability, the strain point and the Young's modulus, and may improve the RI of the glass. However, when too much SrO is added to the glass composition, the density of the glass composition increases. In embodiments, the glass composition generally comprises SrO in a concentration of from greater than or equal to 0.0 mol % to less than or equal to 1.0 mol % and all ranges and sub-ranges between the foregoing values. In some embodiments, the glass composition comprises SrO in amounts greater than or equal to 0.1 mol %, greater than or equal to 0.2 mol %, greater than or equal to 0.3 mol %, greater than or equal to 0.4 mol %, greater than or equal to 0.5 mol %, greater than or equal to 0.6 mol %, greater than or equal to 0.7 mol %, greater than or equal to 0.8 mol %, or greater than or equal to 0.9 mol %. In some embodiments, the glass composition comprises SrO in amounts less than or equal to 0.9 mol %, less than or equal to 0.8 mol %, less than or equal to 0.7 mol %, less than or equal to 0.6 mol %, less than or equal to 0.5 mol %, less than or equal to 0.4 mol % less than or equal to 0.3 mol %, less than or equal to 0.2 mol %, or less than or equal to 0.1 mol %. It should be understood that, in embodiments, any of the above ranges may be combined with any other range.

However, in other embodiments, the glass composition comprises SrO in an amount from greater than or equal to 0.1 mol % to less than or equal to 0.9 mol %, such as from greater than or equal to 0.2 mol % to less than or equal to 0.8 mol %, from greater than or equal to 0.3 mol % to less than or equal to 0.7 mol %, or from greater than or equal to 0.4 mol % to less than or equal to 0.6 mol % and all ranges and sub-ranges between the foregoing values.

$La_2O_3$ may be added to the optical boroaluminate glass composition to increase the RI of the optical boroaluminate glass. However, when too much $La_2O_3$ is added in to the glass composition, the density of the glass composition increases, and the glass melts are easy to devitrify upon cooling. In embodiments, the glass composition generally comprises $La_2O_3$ in a concentration of from greater than or equal to 0.0 mol % to less than or equal to 8.0 mol % and all ranges and sub-ranges between the foregoing values. In some embodiments, the glass composition comprises $La_2O_3$ in amounts greater than or equal to 0.2 mol %, greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, or greater than or equal to 7.5 mol %. In some embodiments, the glass composition comprises $La_2O_3$ in amounts less than or equal to 7.5 mol %, less than or equal to 7.0 mol %, less than or equal to 6.5 mol %, less than or equal to 6.0 mol %, less than or equal to 5.5 mol %, less than or equal to 5.0 mol % less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, less than or equal to 0.5 mol %, or less than or equal to 0.2 mol %. It should be understood that, in embodiments, any of the above ranges may be combined with any other range. However, in other embodiments, the glass composition comprises $La_2O_3$ in an amount from greater than or equal to 0.2 mol % to less than or equal to 7.5 mol %, such as from greater than or equal to 0.5 mol % to less than or equal to 7.0 mol %, from greater than or equal to 1.0 mol % to less than or equal to 6.5 mol %, from greater than or equal to 1.5 mol % to less than or equal to 6.0 mol %, from greater than or equal to 2.0 mol % to less than or equal to 5.5 mol %, from greater than or equal to 2.5 mol % to less than or equal to 5.0 mol %, or from greater than or equal to 3.0 mol % to less than or equal to 4.5 mol % and all ranges and sub-ranges between the foregoing values.

$Nb_2O_5$ may be added to the optical boroaluminate glass composition to increase the RI of the optical boroaluminate glass. In embodiments, the glass composition generally comprises $Nb_2O_5$ in a concentration of from greater than or equal to 0.0 mol % to less than or equal to 20.0 mol % and all ranges and sub-ranges between the foregoing values. In some embodiments, the glass composition comprises $Nb_2O_5$ in amounts greater than or equal to 2.0 mol %, greater than or equal to 4.0 mol %, greater than or equal to 6.0 mol %, greater than or equal to 8.0 mol %, greater than or equal to 10.0 mol %, greater than or equal to 12.0 mol %, greater than or equal to 14.0 mol %, greater than or equal to 16.0 mol %, or greater than or equal to 18.0 mol. In some embodiments, the glass composition comprises $Nb_2O_5$ in amounts less than or equal to 18.0 mol %, less than or equal to 16.0 mol %, less than or equal to 14.0 mol % less than or equal to 12.0 mol %, less than or equal to 10.0 mol %, less than or equal to 8.0 mol %, less than or equal to 6.0 mol %, less than or equal to 4.0 mol %, or less than or equal to 2.0 mol. It should be understood that, in embodiments, any of the above ranges may be combined with any other range. However, in other embodiments, the glass composition comprises $Nb_2O_5$ in an amount from greater than or equal to 2.0 mol % to less than or equal to 20.0 mol %, such as from greater than or equal to 4.0 mol % to less than or equal to 18.0 mol %, from greater than or equal to 6.0 mol % to less than or equal to 16.0 mol %, from greater than or equal to 8.0 mol % to less than or equal to 14.0 mol %, or from greater than or equal to 10.0 mol % to less than or equal to 12.0 mol % and all ranges and sub-ranges between the foregoing values.

Like $Nb_2O_5$, $ZrO_2$ can be added to the optical boroaluminate glass composition to increase the RI of the optical boroaluminate glass. In embodiments, $ZrO_2$ may be present in the optical boroaluminate glass composition in amounts from greater than or equal to 0.0 mol % to less than or equal to 5.0 mol %, such as from greater than or equal to 0.1 mol % to less than or equal to 2.0 mol %, or from greater than or equal to 0.2 mol % to less than or equal to 1.0 mol % and all ranges and sub-ranges between the foregoing values.

Similarly, $TiO_2$ may be added to the optical boroaluminate glass composition to increase the RI of the optical boroaluminate glass. In embodiments, the optical boroaluminate glass composition may be present in amounts from greater than or equal to 0.0 mol % to less than or equal to 15.0 mol %, such as from greater than or equal to 0.5 mol % to less than or equal to 14.5 mol %, from greater than or equal to 1.0 mol % to less than or equal to 14.0 mol %, from greater than or equal to 1.5 mol % to less than or equal to 13.5 mol %, from greater than or equal to 2.0 mol % to less than or equal to 13.0 mol %, from greater than or equal to 2.5 mol % to less than or equal to 12.5 mol %, from greater than or equal to 3.0 mol % to less than or equal to 12.0 mol %, from greater than or equal to 3.5 mol % to less than or equal to 11.5 mol %, from greater than or equal to 4.0 mol % to less than or equal to 11.0 mol %, from greater than or equal to 4.5 mol % to less than or equal to 10.5 mol %, from greater than or equal to 5.0 mol % to less than or equal to 10.0 mol %, from greater than or equal to 5.5 mol % to less than or equal to 9.5 mol %, from greater than or equal to 6.0 mol % to less than or equal to 9.0 mol %, from greater than or equal to 6.5 mol % to less than or equal to 8.5 mol %, or from greater than or equal to 7.0 mol % to less than or equal to 8.0 mol % and all ranges and sub-ranges between the foregoing values.

$SnO_2$ may improve the RI of the optical boroaluminate glass, and may be present as a fining agent in the optical boroaluminate glass, if needed. In embodiments, the glass composition generally comprises $SnO_2$ in a concentration of from greater than or equal to 0.0 mol % to less than or equal to 1.0 mol % and all ranges and sub-ranges between the foregoing values. In some embodiments, the glass composition comprises $SnO_2$ in amounts greater than or equal to 0.1 mol %, greater than or equal to 0.2 mol %, greater than or equal to 0.3 mol %, greater than or equal to 0.4 mol %, greater than or equal to 0.5 mol %, greater than or equal to 0.6 mol %, greater than or equal to 0.7 mol %, greater than or equal to 0.8 mol %, or greater than or equal to 0.9 mol %. In some embodiments, the glass composition comprises $SnO_2$ in amounts less than or equal to 0.9 mol %, less than or equal to 0.8 mol %, less than or equal to 0.7 mol %, less than or equal to 0.6 mol %, less than or equal to 0.5 mol %, less than or equal to 0.4 mol % less than or equal to 0.3 mol %, less than or equal to 0.2 mol %, or less than or equal to 0.1 mol %. It should be understood that, in embodiments, any of the above ranges may be combined with any other range. However, in other embodiments, the glass composition comprises $SnO_2$ in an amount from greater than or equal to 0.1 mol % to less than or equal to 0.9 mol %, such as from greater than or equal to 0.2 mol % to less than or equal to 0.8 mol %, from greater than or equal to 0.3 mol % to less than or equal to 0.7 mol %, or from greater than or equal to 0.4 mol % to less than or equal to 0.6 mol % and all ranges and sub-ranges between the foregoing values.

$Sb_2O_3$ may improve the RI of the optical boroaluminate glass, and may be present as a fining agent in the optical boroaluminate glass, if needed. In embodiments, the glass composition generally comprises $Sb_2O_3$ in a concentration of from greater than or equal to 0.0 mol % to less than or equal to 1.0 mol % and all ranges and sub-ranges between the foregoing values. In some embodiments, the glass composition comprises $Sb_2O_3$ in amounts greater than or equal to 0.1 mol %, greater than or equal to 0.2 mol %, greater than or equal to 0.3 mol %, greater than or equal to 0.4 mol %, greater than or equal to 0.5 mol %, greater than or equal to 0.6 mol %, greater than or equal to 0.7 mol %, greater than or equal to 0.8 mol %, or greater than or equal to 0.9 mol %. In some embodiments, the glass composition comprises $Sb_2O_3$ in amounts less than or equal to 0.9 mol %, less than or equal to 0.8 mol %, less than or equal to 0.7 mol %, less than or equal to 0.6 mol %, less than or equal to 0.5 mol %, less than or equal to 0.4 mol % less than or equal to 0.3 mol %, less than or equal to 0.2 mol %, or less than or equal to 0.1 mol %. It should be understood that, in embodiments, any of the above ranges may be combined with any other range. However, in other embodiments, the glass composition comprises $Sb_2O_3$ in an amount from greater than or equal to 0.1 mol % to less than or equal to 0.9 mol %, such as from greater than or equal to 0.2 mol % to less than or equal to 0.8 mol %, from greater than or equal to 0.3 mol % to less than or equal to 0.7 mol %, or from greater than or equal to 0.4 mol % to less than or equal to 0.6 mol % and all ranges and sub-ranges between the foregoing values.

In addition to the above components, the optical boroaluminate glass, according to one or more embodiments, may include alkali metal oxides, such as, for example, $Li_2O$, $Na_2O$, and $K_2O$. The alkali metal oxides may be added to modify various properties of the glass composition, such as, for example, melting temperature, viscosity, mechanical strength, and chemical durability. In embodiments, the sum of all alkali metal oxides in the optical boroaluminate glass composition may be from greater than or equal to 0.0 mol % to less than or equal to 10.0 mol %, such as from greater than or equal to 2.0 mol % to less than or equal to 8.0 mol %, or from greater than or equal to 4.0 mol % to less than or equal to 6.0 mol % and all ranges and sub-ranges between the foregoing values.

Alkaline earth metal oxides in addition to the CaO and BaO discussed above, such as, for example, MgO and SrO, may be added to optical boroaluminate glass according to one or more embodiments, to modify the physical properties and glass formability of the glass and to increase the refractive index. In embodiments, the sum of all alkaline earth metal oxides, except for CaO and BaO, in the optical boroaluminate glass composition may be from greater than or equal to 0.0 mol % to less than or equal to 5.0 mol %, such as from greater than or equal to 0.1 mol % to less than or equal to 2.0 mol %, or from greater than or equal to 0.2 mol % to less than or equal to 1.0 mol % and all ranges and sub-ranges between the foregoing values.

Refractive index raising components—in addition to the $La_2O_3$ and $Nb_2O_5$ discussed above—include transition metal oxides, such as, for example, ZnO, $TiO_2$, $ZrO_2$, $Ta_2O_5$, and $HfO_2$. These transition metal oxides may be added to optical boroaluminate glass according to embodiments, to increase the refractive index. In embodiments, the sum of all refractive index raising components, including $La_2O_3$ and $Nb_2O_5$, in the optical boroaluminate glass composition may be from greater than or equal to 1.0 mol % to less than or equal to 20.0 mol %, such as from greater than or equal to 8.0 mol % to less than or equal to 18.0 mol %, from greater than or equal to 10.0 mol % to less than or equal to 16.0 mol %, or from greater than or equal to 12.0 mol % to less than or equal to 14.0 mol % and all ranges and sub-ranges between the foregoing values.

Other components may, in embodiments, be added to the optical boroaluminate glass in small amounts as fining agents. Such fining agents include $CeO_2$, $F^-$, $Cl^-$, sulfates, and sulfides. In embodiments, the sum of all fining agents in the optical boroaluminate glass composition may be from greater than or equal to 0.0 mol % to less than or equal to 2.0 mol %, such as from greater than or equal to 0.2 mol % to less than or equal to 1.0 mol %. In other embodiments, the optical boroaluminate glass may comprise fining agents in amounts less than or equal to 1.0 mol %, less than or equal to 0.7 mol %, less than or equal to 0.5 mol %, less than or equal to 0.2 mol %, or less than or equal to 0.1 mol % and all ranges and sub-ranges between the foregoing values.

In some embodiments, the optical boroaluminate glass may be free from one or more of lead, arsenic, and thallium.

Without being bound by any particular theory, some embodiments of the optical boroaluminate glass composition were formed around the eutectic point of the CaO—$Al_2O_3$ binary system, which has a ratio of $CaO/Al_2O_3$ of about 1.78. At this $CaO/Al_2O_3$ ratio, the melting point of the optical boroaluminate glass composition is at or near a minimum for the CaO—$Al_2O_3$ binary system. Using the eutectic ratio of $CaO/Al_2O_3$, other alkaline earth metals, such as, for example BaO and SrO, may be added to the optical boroaluminate glass composition to modify the physical properties of the glass composition. Thus, in embodiments, the ratio of the sum of CaO+BaO+SrO to $Al_2O_3$ is near the eutectic ratio of $CaO/Al_2O_3$. In embodiments, the ratio of $(CaO+BaO+SrO)/Al_2O_3$, in mol %, is from greater than or equal to 1.10 to less than or equal to 2.40, such as from greater than or equal to 1.15 to less than or equal to 2.35, from greater than or equal to 1.20 to less than or equal to 2.30, from greater than or equal to 1.25 to less than or equal to 2.25, from greater than or equal to 1.30 to less than or equal to 2.20, from greater than or equal to 1.35 to less than or equal to 2.15, from greater than or equal to 1.40 to less than or equal to 2.10, from greater than or equal to 1.45 to less than or equal to 2.05, from greater than or equal to 1.50 to less than or equal to 2.00, from greater than or equal to 1.55 to less than or equal to 1.95, from greater than or equal to 1.60 to less than or equal to 1.90, from greater than or equal to 1.65 to less than or equal to 1.85, or from greater than or equal to 1.70 to less than or equal to 1.80 and all ranges and sub-ranges between the foregoing values.

In addition, the sum of $CaO+BaO+SrO+Al_2O_3$ is, in some embodiments, greater than or equal to 43.0 mol %, such as greater than or equal to 45.0 mol %, greater than or equal to 50.0 mol %, greater than or equal to 55.0 mol %, greater than or equal to 60.0 mol %, greater than or equal to 65.0 mol %, greater than or equal to 70.0 mol %, or greater than or equal to 75.0 mol %. In some embodiments, the sum of CaO+

BaO+SrO+Al$_2$O$_3$ is less than or equal to 78.0 mol %, such as less than or equal to 75.0 mol %, less than or equal to 70.0 mol %, less than or equal to 65.0 mol %, less than or equal to 60.0 mol %, less than or equal to 55.0 mol %, less than or equal to 50.0 mol %, or less than or equal to 45.0 mol %. It should be understood that, in embodiments, any of the above ranges may be combined with any other range. However, in other embodiments, the sum of CaO+BaO+SrO+Al$_2$O$_3$ is from greater than or equal to 43.0 mol % to less than or equal to 78.0 mol %, such as from greater than or equal to 45.0 mol % to less than or equal to 75.0 mol %, from greater than or equal to 50.0 mol % to less than or equal to 70.0 mol %, or from greater than or equal to 55.0 mol % to less than or equal to 65.0 mol % and all ranges and sub-ranges between the foregoing values.

Boroaluminate glasses, such as the optical boroaluminate glasses disclosed and described herein, are quite different than silicate glasses or even aluminosilicate glasses. For instance, unlike silicate or aluminosilicate glasses, boroaluminate glasses can be difficult to melt and, in part because of the lower amount of SiO$_2$ and greater amount of Al$_2$O$_3$, boroaluminate glasses may have decreased chemical stability and durability. In addition, boroaluminate glasses can be hard to melt, hard to form, or otherwise unsuitable for forming into glass articles when components are added to the base CaO—Al$_2$O$_3$ system. Accordingly, the addition of components to the CaO—Al$_2$O$_3$ binary system, such as, for example, B$_2$O$_3$ into the optical boroaluminate glass composition was not guaranteed to decrease the glass transition temperature and improve the chemical durability and chemical stability of the optical boroaluminate glass. However, it was found that adding the amounts of B$_2$O$_3$ disclosed and described herein to the CaO—Al$_2$O$_3$ binary system provided a glass that was formable, had good chemical durability and chemical stability, and had better thermal stability upon heating.

Even in embodiments where the ratio of (CaO+BaO+SrO)/Al$_2$O$_3$ is at or near the eutectic point of the system, the melting point of the optical boroaluminate glass composition may still be unacceptably high and the chemical stability of the optical boroaluminate glass may not be sufficient. Accordingly, in some embodiments, B$_2$O$_3$ is added to the system to improve the formability and chemical stability of the glass. Table 1 below shows the effect of adding B$_2$O$_3$ to the CaO—Al$_2$O$_3$ binary system.

TABLE 1

| Al$_2$O$_3$ (mole %) | CaO (mole %) | B$_2$O$_3$ (mole %) | T$_g$ (° C.) | T$_x$ (° C.) | T$_x$ − T$_g$ (° C.) |
|---|---|---|---|---|---|
| 35.7 | 64.3 | 0.0 | 820 | 904 | 84 |
| 33.8 | 61.2 | 5.0 | 798 | 896 | 98 |
| 32.6 | 58.2 | 9.2 | 765 | 873 | 108 |
| 30.1 | 55.9 | 13.9 | 720 | 833 | 113 |
| 29.3 | 54.0 | 16.7 | 698 | 841 | 143 |
| 26.5 | 52.4 | 21.1 | 659 | 857 | 198 |
| 28.1 | 49.7 | 22.2 | 641 | 861 | 220 |
| 25.9 | 46.2 | 27.8 | 624 | 861 | 237 |
| 23.7 | 44.3 | 32.0 | 607 | 826 | 219 |

As shown in Table 1 and FIG. 1—which shows the results in Table 1 in graphical form—as B$_2$O$_3$ is added to the optical boroaluminate glass composition, the glass transition temperature (T$_g$) decreases and the temperature of onset of crystallization when the glass is reheated (T$_x$) also decreases. However, the difference between T$_x$ and T$_g$ increases as B$_2$O$_3$ is added to the glass composition. The addition of B$_2$O$_3$ also decreases the liquidus temperature of boroaluminate glasses.

In one or more embodiments, the ratio of B$_2$O$_3$/(CaO+BaO+SrO+Al$_2$O$_3$), in mol %, is greater than or equal to 0.15, such as greater than or equal to 0.20, greater than or equal to 0.25, greater than or equal to 0.30, greater than or equal to 0.35, greater than or equal to 0.45, or greater than or equal to 0.50. (The higher the ratio, the better is glass formability. However, if the ratio is too high, the chemical durability (e.g., resistance to water) can be negatively impacted). In some embodiments, the ratio of B$_2$O$_3$/(CaO+BaO+SrO+Al$_2$O$_3$), in mol %, is less than or equal to 0.55, such as less than or equal to 0.50, less than or equal to 0.45, less than or equal to 0.40, less than or equal to 0.35, less than or equal to 0.30, less than or equal to 0.25, or less than or equal to 0.20. It should be understood that, in embodiments, any of the above ranges may be combined with any other range. However, in other embodiments, the ratio of B$_2$O$_3$/(CaO+BaO+SrO+Al$_2$O$_3$), in mol %, is from greater than or equal to 0.15 to less than or equal to 0.55, such as from greater than or equal to 0.20 to less than or equal to 0.50, from greater than or equal to 0.25 to less than or equal to 0.45, or from greater than or equal to 0.30 to less than or equal to 0.40 and all ranges and sub-ranges between the foregoing values.

From this ternary system of CaO—Al$_2$O$_3$—B$_2$O$_3$ it was found that other components could be added to the optical aluminosilicate glass to improve various optical properties of the glass, such as, for example, the refractive index of the optical boroaluminate glass. Notably, transition metal elements and La$_2$O$_3$ were able to be added to the boroaluminate glass composition to increase the RI of the optical boroaluminate glass. It was previously unexpected that components such as transition metal elements and La$_2$O$_3$ could be added to boroaluminate glasses in amounts that could significantly increase the RI of the glass composition without also hindering other properties of the glass composition, such as the T$_g$, transmittance, liquidus temperature, and liquidus viscosity. However, it was found that sufficient amounts of transition metal elements and La$_2$O$_3$ or could be added to the glass composition to significantly increase the RI without unduly hindering other properties of the optical boroaluminate glass composition. Various properties of optical boroaluminate glasses disclosed and described in embodiments herein are discussed below.

The refractive index of optical boroaluminate glasses disclosed in embodiments may be affected by the addition of transition metal elements and La$_2$O$_3$ into the glass composition. In particular, the addition of lanthanum and niobium oxides in the glass composition increases the RI of the glass composition. In one or more embodiments, the RI was measured by Metricon Model 2010 Prism Coupler. RI measurements were performed on the Metricon Model 2010 Prism Coupler at wavelengths of 406 nm, 473 nm, 532 nm, 633 nm, 790 nm and 981 nm using various laser sources. The Metricon 2010 prism coupler operates as a fully automated refractometer, in which the refractive index of bulk materials and/or films can be measured. Refractive indices of bulk materials, such as the provided glass samples (described in Tables 2 and 3) are measured by the Metricon 2010 Prism Coupler. Measured index of refraction results were fitted to a Cauchy or Sellmeier dispersion equation and constants were determined. The refractive index for optical glasses is specified at a wavelength of 589.3 nm. Using fitted index dispersion values, the V$_D$ Abbe number is calculated for each glass composition. In one or more embodiments, the optical boroaluminate glass may have a RI, measured at 589.3 nm, of greater than or equal to 1.62, greater than or equal to 1.63, greater than or equal to 1.64, greater than or equal to 1.65, greater than or equal to 1.66, greater than or equal to 1.67, greater than or equal to 1.68, greater than or equal to 1.69, greater than or equal to 1.70, greater than or equal to 1.71, greater than or equal to 1.72, greater than or equal to 1.73, greater than or equal to 1.74, greater than or equal to 1.75, greater than or equal to 1.76, greater than or equal to 1.77, greater than or equal to 1.78, or greater than or equal to 1.79. In some embodiments, the optical boroaluminate glass may have a RI, measured at 589.3 nm, of less than or equal to 1.80, less than or equal to 1.79, less than or equal to 1.78, less than or equal to 1.77, less than or equal to 1.76, less than or equal to 1.75, less than or equal to 1.74, less than or equal to 1.73, less than or equal to 1.72, less than or equal to 1.71, less than or equal to 1.70, less than or equal to 1.69, less than or equal to 1.68, less than or equal to 1.67, less than or equal to 1.66, less than or equal to 1.65, or less than or equal to 1.64. It should be understood that, in embodiments, any of the above ranges may be combined with any other range. However, in other embodiments, the optical boroaluminate glass may have a RI, measured at 589.3 nm, from greater than or equal to 1.62 to less than or equal to 1.80, such as from greater than or equal to 1.63 to less than or equal to 1.79, from greater than or equal to 1.64 to less than or equal to 1.78, from greater than or equal to 1.65 to less than or equal to 1.78, from greater than or equal to 1.66 to less than or equal to 1.77, from greater than or equal to 1.67 to less than or equal to 1.76, from greater than or equal to 1.68 to less than or equal to 1.75, from greater than or equal to 1.69 to less than or equal to 1.74, or from greater than or equal to 1.70 to less than or equal to 1.73 and all ranges and sub-ranges between the foregoing values.

As disclosed above, the density of the optical boroaluminate glass may, in one or more embodiments, be relatively low. In some embodiments, the density was measured according to ASTM C693, and the density of the optical boroaluminate glass may be less than or equal to 4.00 g/cm$^3$, such as less than or equal to 3.75 g/cm$^3$, less than or equal to 3.50 g/cm$^3$, less than or equal to 3.25 g/cm$^3$, less than or equal to 3.00 g/cm$^3$, or less than or equal to 2.75 g/cm$^3$. In one or more embodiments, the density of the optical boroaluminate glass composition may be from greater than or equal to 2.25 g/cm$^3$ to less than or equal to 4.00 g/cm$^3$, such as from greater than or equal to 2.25 g/cm$^3$ to less than or equal to 3.75 g/cm$^3$, from greater than or equal to 2.25 g/cm$^3$ to less than or equal to 3.50 g/cm$^3$, from greater than or equal to 2.25 g/cm$^3$ to less than or equal to 3.25 g/cm$^3$, from greater than or equal to 2.25 g/cm$^3$ to less than or equal to 3.00 g/cm$^3$, or from greater than or equal to 2.25 g/cm$^3$ to less than or equal to 2.75 g/cm$^3$ and all ranges and sub-ranges between the foregoing values.

Liquidus temperature as used herein is measured by the gradient furnace method. This method conforms to ASTM C829-81 Standard Practices for Measurement of Liquidus Temperature of Glass. In one or more embodiments the liquidus temperature of the optical boroaluminate glass may be from greater than or equal to 1000° C. to less than or equal to 1350° C., such as from greater than or equal to 1010° C. to less than or equal to 1340° C., from greater than or equal to 1020° C. to less than or equal to 1330° C., from greater than or equal to 1030° C. to less than or equal to 1320° C., from greater than or equal to 1040° C. to less than or equal to 1310° C., from greater than or equal to 1050° C. to less than or equal to 1300° C., from greater than or equal to 1060° C. to less than or equal to 1290° C., from greater than or equal to 1070° C. to less than or equal to 1280° C., from greater than or equal to 1080° C. to less than or equal to 1270° C., from greater than or equal to 1090° C. to less than or equal to 1260° C., from greater than or equal to 1100° C. to less than or equal to 1250° C., from greater than or equal to 1110° C. to less than or equal to 1240° C., from greater than or equal to 1120° C. to less than or equal to 1230° C., from greater than or equal to 1130° C. to less than or equal to 1220° C., from greater than or equal to 1140° C. to less than or equal to 1210° C., from greater than or equal to 1150° C. to less than or equal to 1200° C., from greater than or equal to 1160° C. to less than or equal to 1190° C., or from greater than or equal to 1170° C. to less than or equal to 1180° C. and all ranges and sub-ranges between the foregoing values.

As used herein "chemical durability" of the optical boroaluminate glasses disclosed herein is measured by the Advanced Optics (AO) losses test and the Nano Strip 2X test, which will be described in more detail below.

For the AO losses test, dried glass samples having a ratio of surface area to volume used in of 0.33 cm$^{-1}$ are etched in 10 wt % HCl for 10 min at 25° C. After etching for 10 minutes, the samples are quenched in de-ionized (DI) water and rinsed in 18 MΩ water. Then the samples are dried by high-pure nitrogen gas and placed in a desiccator overnight. Weight loss normalized to surface area (mg/mm$^2$) and weight loss percentage (wt %) are then calculated. In embodiments, the AO losses are less than or equal to 0.040 mg/mm$^2$, such as less than or equal to 0.035 mg/mm$^2$, less than or equal to 0.030 mg/mm$^2$, less than or equal to 0.025 mg/mm$^2$, less than or equal to 0.020 mg/mm$^2$, less than or equal to 0.015 mg/mm$^2$, less than or equal to 0.010 mg/mm$^2$, less than or equal to 0.005 mg/mm$^2$, less than or equal to 0.004 mg/mm$^2$, less than or equal to 0.003 mg/mm$^2$, less than or equal to 0.003 mg/mm$^2$, less than or equal to 0.002 mg/mm$^2$, or less than or equal to 0.001 mg/mm$^2$.

In the Nano Strip 2X test, dried samples having ratio of surface area to volume of 0.08 cm$^{-1}$ are submerged in 600 mL of Nanostrip 2X solution (Capitol Scientific, 85% $H_2SO_4$ and <1% $H_2O_2$) for 50 min at 70° C. with stirring at 400 rpm speed. After 50 minutes, the samples were quenched in DI water and rinsed in 18 MΩ water. The samples are then dried by high-pure nitrogen gas and placed in a desiccator overnight. The weight loss normalized to surface area (mg/mm$^2$) and weight loss percentage (wt %) are calculated. In embodiments, the Nano Strip 2X test resulted in losses of less than or equal to 0.015 mg/mm$^2$, such as less than or equal to 0.014 mg/mm$^2$, less than or equal to 0.013 mg/mm$^2$, less than or equal to 0.012 mg/mm$^2$, less than or equal to 0.011 mg/mm$^2$, less than or equal to 0.010 mg/mm$^2$, less than or equal to 0.009 mg/mm$^2$, less than or equal to 0.008 mg/mm$^2$, less than or equal to 0.007 mg/mm$^2$, less than or equal to 0.006 mg/mm$^2$, less than or equal to 0.005 mg/mm$^2$, less than or equal to 0.004 mg/mm$^2$, less than or equal to 0.003 mg/mm$^2$, less than or equal to 0.002 mg/mm$^2$, or less than or equal to 0.001 mg/mm$^2$.

As described herein "Young's modulus" is measured by Resonant Ultrasound Spectroscopy, using a Quasar RUSpec 4000 manufactured by Magnaflux. The Young's modulus of the optical boroaluminate glass is from greater than or equal to 75.0 GPa to less than or equal to 110.0 GPa, such as from greater than or equal to 80.0 GPa to less than or equal to 105.0 GPa, from greater than or equal to 85.0 GPa to less than or equal to 100.0 GPa, or from greater than or equal to 90.0 GPa to less than or equal to 95.0 GPa and all ranges and sub-ranges between the foregoing values.

The thermal stability of the optical boroaluminate glass composition can be determined by measuring the difference between $T_x$ and $T_g$ (i.e., $T_x-T_g$). The $T_x-T_g$ value is measured as described hereinabove. In one or more embodiments, the $T_x-T_g$ of the optical boroaluminate glass may be from greater than or equal to 100° C. to less than or equal to 250° C., such as from greater than or equal to 110° C. to less than or equal to 240° C., from greater than or equal to 120° C. to less than or equal to 230° C., from greater than or equal to 130° C. to less than or equal to 220° C., from greater than or equal to 140° C. to less than or equal to 210° C., from greater than or equal to 150° C. to less than or equal to 200° C., from greater than or equal to 160° C. to less than or equal to 190° C., or from greater than or equal to 170° C. to less than or equal to 180° C. and all ranges and sub-ranges between the foregoing values. In other embodiments, the $T_x-T_g$ of the optical boroaluminate glass may be from greater than or equal to 130° C. to less than or equal to 170° C., such as from greater than or equal to 140° C. to less than or equal to 165° C.

In one or more embodiments, the softening point of the boroaluminate glass composition may be from greater than or equal to 700.0° C. to less than or equal to 810.0° C., such as from greater than or equal to 710.0° C. to less than or equal to 790.0° C., from greater than or equal to 720.0° C. to less than or equal to 780.0° C., from greater than or equal to 730.0° C. to less than or equal to 770.0° C., from greater than or equal to 740.0° C. to less than or equal to 760.0° C., or from greater than or equal to 745.0° C. to less than or equal to 755.0° C. and all ranges and sub-ranges between the foregoing values. The softening point was determined using the parallel plate viscosity method of ASTM C1351M-96 (2012).

In embodiments, the annealing temperature of the optical boroaluminate glass may be from greater than or equal to 550° C. to less than or equal to 680° C., such as from greater than or equal to 560° C. to less than or equal to 670° C., from greater than or equal to 570° C. to less than or equal to 660° C., from greater than or equal to 580° C. to less than or equal to 650° C., from greater than or equal to 590° C. to less than or equal to 640° C., from greater than or equal to 600° C. to less than or equal to 630° C., or from greater than or equal to 610° C. to less than or equal to 620° C. and all ranges and sub-ranges between the foregoing values. The annealing temperature is determined using the beam bending viscosity method of ASTM C598-93(2013). It should be understood that as used herein, "annealing temperature" and "annealing point" are synonymous.

In embodiments, the coefficient of thermal expansion of the boroaluminate glass composition may be from greater than or equal to 5.50 ppm/° C. to less than or equal to 13.50 ppm/° C., such as from greater than or equal to 5.75 ppm/° C. to less than or equal to 13.25 ppm/° C., from greater than or equal to 6.00 ppm/° C. to less than or equal to 13.00 ppm/° C., from greater than or equal to 6.25 ppm/° C. to less than or equal to 12.75 ppm/° C., from greater than or equal to 6.50 ppm/° C. to less than or equal to 12.50 ppm/° C., from greater than or equal to 6.75 ppm/° C. to less than or equal to 12.25 ppm/° C., from greater than or equal to 7.00 ppm/° C. to less than or equal to 12.00 ppm/° C., from greater than or equal to 7.25 ppm/° C. to less than or equal to 11.75 ppm/° C., from greater than or equal to 7.50 ppm/° C. to less than or equal to 11.50 ppm/° C., from greater than or equal to 7.75 ppm/° C. to less than or equal to 11.25 ppm/° C., from greater than or equal to 8.00 ppm/° C. to less than or equal to 11.00 ppm/° C., from greater than or equal to 8.25 ppm/° C. to less than or equal to 10.75 ppm/° C., from greater than or equal to 8.50 ppm/° C. to less than or equal to 10.50 ppm/° C., from greater than or equal to 8.75 ppm/° C. to less than or equal to 10.25 ppm/° C., or from greater than or equal to 9.00 ppm/° C. to less than or equal to 10.00 ppm/° C. and all ranges and sub-ranges between the foregoing values. The coefficient of thermal expansion (CTE) was determined using a push-rod dilatometer in accordance with ASTM E228-11.

As disclosed above, optical boroaluminate glasses according to embodiments disclosed and described herein may be used in augmented reality devices, virtual reality devices, optical fibers, or optical lenses.

According to a first clause, an optical boroaluminate glass article comprises: from greater than or equal to 10.0 mol % to less than or equal to 30.0 mol % $Al_2O_3$; from greater than or equal to 10.0 mol % to less than or equal to 55.0 mol % CaO; from greater than or equal to 10.0 mol % to less than or equal to 25.0 mol % $B_2O_3$; from greater than or equal to 0.0 mol % to less than or equal to 30.0 mol % $SiO_2$; from greater than or equal to 1.0 mol % to less than or equal to 20.0 mol % refractive index raising components, wherein the optical boroaluminate glass article has a refractive index of the glass article, measured at 589.3 nm, of greater than or equal to 1.62, and the optical boroaluminate glass article has a density of less than or equal to 4.00 g/cm$^3$.

A second clause includes the optical boroaluminate glass according to the first clause, wherein the optical boroaluminate glass article comprises from greater than or equal to 0.0 mol % to less than or equal to 8.0 mol % $La_2O_3$.

A third clause includes the optical boroaluminate glass according to any one of the first and second clauses, wherein the optical boroaluminate glass article comprises from greater than or equal to 0.0 mol % to less than or equal to 20.0 mol % $Nb_2O_5$.

A fourth clause includes the optical boroaluminate glass according to any one of the first to third clauses, wherein the optical boroaluminate glass article comprises from greater than or equal to 6.0 mol % to less than or equal to 16.0 mol % $Nb_2O_5$.

A fifth clause includes the optical boroaluminate glass according to any one of the first to fourth clauses, wherein the optical boroaluminate glass article comprises: from greater than or equal to 0.0 mol % to less than or equal to 25.0 mol % BaO; from greater than or equal to 0.0 mol % to less than or equal to 1.0 mol % SrO; from greater than or equal to 0.0 mol % to less than or equal to 1.0 mol % $SnO_2$; and from greater than or equal to 0.0 mol % to less than or equal to 1.0 mol % $Sb_2O_3$.

A sixth clause includes the optical boroaluminate glass according to any one of the first to fifth clauses, wherein the optical boroaluminate glass article comprises: from greater than or equal to 0.0 mol % to less than or equal to 10.0 mol % alkali metal oxides; from greater than or equal to 0.0 mol % to less than or equal to 5.0 mol % MgO and SrO; and from greater than or equal to 0.0 mol % to less than or equal to 1.0 mol % fining agents.

A seventh clause includes the optical boroaluminate glass according to any one of the first to sixth clauses, wherein a ratio of CaO+BaO+SrO/$Al_2O_3$, in mol %, is from greater than or equal to 1.10 to less than or equal to 2.40.

An eighth clause includes the optical boroaluminate glass according to any one of the first to seventh clauses, wherein a ratio of $B_2O_3$/(CaO+BaO+SrO+$Al_2O_3$), in mol %, is greater than or equal to 0.15.

A ninth clause includes the optical boroaluminate glass according to any one of the first to eighth clauses, wherein a ratio of $B_2O_3/(CaO+BaO+SrO+Al_2O_3)$, in mol %, is greater than or equal to 0.20 to less than or equal to 0.50.

A tenth clause includes the optical boroaluminate glass according to any one of the first to ninth clauses, wherein the optical boroaluminate glass article has a refractive index, measured at 589.3 nm, greater than or equal to 1.69.

An eleventh clause includes the optical boroaluminate glass according to any one of the first to tenth clauses, wherein the optical boroaluminate glass article has a refractive index, measured at 589.3 nm, from greater than or equal to 1.69 to less than or equal to 1.80.

A twelfth clause includes the optical boroaluminate glass according to any one of the first to eleventh clauses, wherein the optical boroaluminate glass article has a density from greater than or equal to 2.25 g/cm³ to less than or equal to 4.00 g/cm³.

A thirteenth clause includes the optical boroaluminate glass according to any one of the first to twelfth clauses, wherein the optical boroaluminate glass article has a density from greater than or equal to 2.25 g/cm³ to less than or equal to 3.00 g/cm³.

A fourteenth clause includes the optical boroaluminate glass according to any one of the first to thirteenth clauses, wherein the optical boroaluminate glass article has a liquidus temperature of the optical boroaluminate glass may be from greater than or equal to 1000° C. to less than or equal to 1350° C.

A fifteenth clause includes the optical boroaluminate glass according to any one of the first to fourteenth clauses, wherein the optical boroaluminate glass article has AO losses less than or equal to 0.040 mg/mm².

A sixteenth clause includes the optical boroaluminate glass according to any one of the first to fifteenth clauses, wherein the optical boroaluminate glass article has AO losses less than or equal to 0.005 mg/mm².

A seventeenth clause includes the optical boroaluminate glass according to any one of the first to sixteenth clauses, wherein the optical boroaluminate glass article has Nano Strip 2X test losses of less than or equal to 0.015 mg/mm².

An eighteenth clause includes the optical boroaluminate glass according to any one of the first to seventeenth clauses, wherein the optical boroaluminate glass article has a glass annealing temperature from greater than or equal to 550° C. to less than or equal to 680° C.

A nineteenth clause includes the optical boroaluminate glass according to any one of the first to eighteenth clauses, wherein the optical boroaluminate glass article has a $T_x-T_g$ value from greater than or equal to 80° C. to less than or equal to 250° C.

A twentieth clause includes the optical boroaluminate glass according to any one of the first to nineteenth clauses, wherein the optical boroaluminate glass article has a $T_x-T_g$ value from greater than or equal to 130° C. to less than or equal to 170° C.

EXAMPLES

Embodiments will be further clarified by the following examples. It should be understood that these examples are not limiting to the embodiments described above.

Glass compositions a having components listed in Table 2 below were prepared by conventional glass forming methods. In Table 2, all components are in mol %.

Representative glass compositions and properties are summarized in Tables 2 and 3, respectively. Table 2 lists disclosed examples of glass compositions. Glasses are made from batches (e.g., glass melts of 1000 g 100% theoretical yield; typical yields were about 900 g or 90 wt % due to, e.g., mechanical loss) of source or starting materials including, for example, $B_2O_3$ (Chemical Distributors Inc., 98.69%), $Al_2O_3$ (Almatis, 99.78%), $SiO_2$ (MinTec, 99.999%), $Li_2CO_3$ (ChemPoint (FMC)), $Na_2CO_3$ (Fisher Scientific, 99.99%), $CaCO_3$ (Fisher Scientific, 99.9%), $BaCO_3$ (AMREX Chemical), ZnO (Zochem Inc. Distributor: Meyers Chemical Inc.), $ZrO_2$ (MEL Chemicals PRC), $TiO_2$ (Harry W Gaffney, 99.68%), $La_2O_3$ (MolyCorp), $Nb_2O_5$ (Alfa Aesar), $SnO_2$ (Endeka Ceramics), and $Sb_2O_3$ (Alfa Aesar) that are melted in Pt crucibles at from 1350° C. to 1500° C. in air with an aluminum cover.

TABLE 2

| | mol % | | | | | | | | | | | | | |
|---|---|---|---|---|---|---|---|---|---|---|---|---|---|---|
| Ex. | $SiO_2$ | $Al_2O_3$ | $B_2O_3$ | CaO | BaO | SrO | $SnO_2$ | $Sb_2O_3$ | $La_2O_3$ | $Nb_2O_5$ | $ZrO_2$ | $TiO_2$ | $Li_2O$ | $Na_2O$ |
| 1 | 29.3 | 17.9 | 14.9 | 32.7 | | | | | 5.1 | | | | | |
| 2 | 20.7 | 20.3 | 17.1 | 36.3 | | | | | | 5.6 | | | | |
| 3 | 0 | 27.5 | 22.7 | 48.9 | | | | | 1 | | | | | |
| 4 | 0.8 | 27.6 | 14.8 | 49.2 | | | | | | 7.6 | | | | |
| 5 | 0.7 | 26.1 | 14.7 | 44.2 | 5.6 | 0.2 | | | | 8.4 | | | | |
| 6 | 3.9 | 24.4 | 23.6 | 23.7 | 24.3 | | | | | | | | | |
| 7 | 3.7 | 22.7 | 20.8 | 22.5 | 20.6 | | | | | 9.6 | | | | |
| 8 | 7.6 | 21.6 | 20 | 21.5 | 20.2 | | | | | 9.2 | | | | |
| 9 | 9.6 | 21 | 19.7 | 21 | 19.7 | | | | | 9.1 | | | | |
| 10 | 11.1 | 22.7 | 13.4 | 29.2 | 13.9 | | | | | 9.7 | | | | |
| 11 | 19.9 | 19.9 | 20.2 | 34.9 | | | 0.1 | 0.1 | | 4.9 | | | | |
| 12 | 20.3 | 19.6 | 20 | 30 | | | 0.1 | 0.1 | | 9.9 | | | | |
| 13 | 20.4 | 20.2 | 20.2 | 23.7 | | | 0.1 | 0.1 | | 15.2 | | | | |
| 14 | 15.1 | 19.2 | 20.1 | 30.5 | 5 | | 0.1 | 0.1 | | 9.8 | | | | |
| 15 | 15 | 14.7 | 20.3 | 30.3 | 4.6 | | 0.1 | 0.1 | | 14.8 | | | | |
| 16 | 12 | 22.2 | 13 | 24.7 | 13.4 | | 0.1 | 0.1 | | 14.4 | | | | |
| 17 | 19.2 | 21.9 | 13.3 | 15.7 | 14.5 | | 0.1 | 0.1 | | 15.2 | | | | |
| 18 | 14.9 | 21.8 | 13.1 | 20.5 | 14.6 | | 0.1 | 0.1 | | 14.9 | | | | |
| 19 | 21.2 | 18.7 | 20.3 | 30.0 | | | | | | | | 9.8 | | |
| 20 | 20.6 | 18.9 | 20.3 | 35.2 | | | | | 5.0 | | | | | |
| 21 | 21.1 | 18.6 | 20.0 | 38.3 | | | | | | | 2.0 | | | |
| 22 | 20.4 | 18.8 | 20.2 | 30.7 | | | | | | 4.9 | | 5.0 | | |
| 23 | 20.5 | 19.5 | 20.2 | 30.2 | | | | | 4.9 | 4.8 | | | | |
| 24 | 21.0 | 19.1 | 19.9 | 30.4 | | | | | | 4.8 | | | 4.7 | |
| 25 | 20.4 | 19.5 | 20.3 | 30.8 | | | | | | 4.9 | | | | 4.2 |
| 26 | 0 | 26.4 | 21.8 | 46.9 | | | | | 5 | | | | | |

Various properties of the glasses formed according to Table 2 are provided below in Table 3. The AO losses and Nano Strip 2X test were performed as described herein. $V_d$ in Table 3 is the Abbe number and is calculated using the following equation:

$$V_D = \frac{n_D - 1}{n_F - n_c}$$

In the above equation, $n_D$, $n_F$, and $n_C$ is the refractive index measured at 589.3 nm, 486.1 nm, and 565.3 nm, respectively. The remaining properties listed in Table 3 were measured by conventional methods.

TABLE 3

| Sample | Density (g/cm³) | RI (589.3 nm) | $V_d$ | Annealing Point (° C.) | Softening Point (° C.) | CTE < 300° C. on heating ppm/° C. | Liquidus temp. (° C.) |
|---|---|---|---|---|---|---|---|
| 1 | | 1.6378 | | | | | |
| 2 | | 1.6678 | | | | | |
| 3 | | 1.629 | | | | | |
| 4 | 3.167 | 1.7222 | 41.24 | 660.9 | 784.5 | 7.96 | |
| 5 | 3.347 | 1.7235 | 39.24 | 668.2 | 795.6 | 8.2 | >1310 |
| 6 | 3.381 | 1.6360 | 49.84 | 603.6 | 746.7 | 8.87 | 1155 |
| 7 | 3.639 | 1.7355 | 36.89 | 623.5 | 748.3 | 8.09 | 1240 |
| 8 | 3.618 | 1.7299 | 39.28 | 624.2 | 750.7 | 8.04 | 1190 |
| 9 | 3.585 | 1.7262 | 36.25 | 628.1 | 752.5 | 7.79 | 1160 |
| 10 | 3.545 | 1.7407 | 39.45 | 657.6 | 787.3 | 7.81 | >1280 |
| 11 | 2.945 | 1.6622 | 46.19 | 642.1 | 771.2 | 6.8 | 1190 |
| 12 | 3.115 | 1.7107 | 36.76 | 642.9 | 766 | 13.26 | 1275 |
| 13 | 3.234 | 1.7616 | 30.76 | 634.5 | 756.2 | 5.95 | 1275 |
| 14 | 3.277 | 1.7208 | 38.54 | 635.7 | 756.1 | 7.11 | 1260 |
| 15 | 3.485 | 1.7853 | 32.75 | 621.6 | 740.2 | 7.21 | |
| 16 | 3.686 | 1.7952 | 32.34 | | | | |
| 17 | 3.627 | 1.7835 | 34.18 | 657.2 | 781.9 | 7.2 | 1325 |
| 18 | 3.674 | 1.7732 | 32.06 | 653.9 | 780.8 | 6.66 | 1295 |
| 19 | 2.787 | 1.6500 | 43.44 | 641.9 | 768.7 | 6.6 | 1100 |
| 20 | 3.135 | 1.6451 | 55.69 | 650.4 | 776.8 | 7.64 | 1040 |
| 21 | 2.782 | 1.6220 | 54.33 | 639.6 | 774.2 | 6.48 | 1050 |
| 22 | 2.952 | 1.6880 | 39.10 | 654.9 | 764.6 | 7.06 | 1170 |
| 23 | 3.311 | 1.6962 | 43.97 | 580 | 777.6 | 7.13 | 1170 |
| 24 | 2.898 | 1.6535 | 44.62 | 595.1 | 707.5 | 7.36 | 1185 |
| 25 | 2.887 | 1.6428 | 44.11 | 641.9 | 726.4 | 6.6 | 1180 |
| 26 | | 1.644 | | | | | |

| Sample | $T_x$-$T_g$ (° C.) | AO losses (mg/mm²) | Nano Strip 2X (mg/mm²) | Young's Modulus (GPa) |
|---|---|---|---|---|
| 1 | | | | |
| 2 | | | | |
| 3 | | | | |
| 4 | 167 | 0.0009 | 0.0117 | 104.38 |
| 5 | 163 | 0.0014 | | 99.35 |
| 6 | — | 0.0358 | | 76.07 |
| 7 | 141 | 0.0011 | 0.0128 | 86.68 |
| 8 | 150 | 0.0012 | | 86.54 |
| 9 | 145 | 0.0011 | 0.0129 | 86.75 |
| 10 | 153 | 0.0005 | 0.0013 | 93.98 |
| 11 | 169 | | | 93.91 |
| 12 | 144 | | | 94.88 |
| 13 | 130 | | | 97.70 |
| 14 | 166 | | | 93.77 |
| 15 | 129 | | 0.0001 | |
| 16 | 130 | | 0.0002 | |
| 17 | 146 | | 0.0002 | 95.63 |
| 18 | 144 | | 0.0002 | 93.70 |
| 19 | 160 | | 0.0043 | |
| 20 | 186 | | 0.0187 | |
| 21 | 197 | | 0.0184 | |
| 22 | 168 | | 0.0022 | |
| 23 | 185 | | 0.0055 | |
| 24 | 166 | | 0.0036 | |
| 25 | 185 | | 0.0052 | |
| 26 | | | | |

The difference between $T_x$ and $T_g$ increases with the introduction of $B_2O_3$ into boroaluminate glass. The addition of $B_2O_3$ also decreases the liquidus temperature of boroaluminate glasses. For Samples 4-8, the ratio of $(CaO+BaO+SrO)/Al_2O_3$ is around 1.93, and with $B_2O_3$ content increasing from 14.7 mol % to 23.6 mol %, and the liquidus temperature decreases from >1310° C. to 1155° C. The addition of $SiO_2$ decreases the liquidus temperature of boroaluminate glasses. For Examples 6, 7, and 8, with $SiO_2$ content increasing from 3.7 mol % to 9.6 mol %, the liquidus temperature decreases from 1240° C. to 1160° C.

$Nb_2O_5$ has a great effect on increasing RI. As shown in Examples 10-12, as the $Nb_2O_5$ content increases from 4.9 mol %-15.2 mol %, the RI at 589.3 nm increases from 1.6622 to 1.7616. However, the addition of $SiO_2$ has a small effect on the decrease of RI. In Examples 6-8 and 15-17, as the $SiO_2$ content increases from 3.7 mol %-9.6 mol % and 12.0 mol %-14.9 mol %, the RI decreases to 0.0093 and 0.022.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical boroaluminate glass article comprising:
   from greater than or equal to 10.0 mol % to less than or equal to 30.0 mol % $Al_2O_3$;
   from greater than or equal to 10.0 mol % to less than or equal to 55.0 mol % CaO;
   from greater than or equal to 10.0 mol % to less than or equal to 25.0 mol % $B_2O_3$;
   from greater than or equal to 0.0 mol % to less than or equal to 30.0 mol % $SiO_2$; and
   one of: (a) $La_2O_3$ from greater than or equal to 3.0 mol % to less than or equal to 8.0 mol %, or (b) $Nb_2O_5$ from greater than or equal to 4.0 mol % to less than or equal to 20.0 mol %, wherein
   the optical boroaluminate glass article has a refractive index, measured at 589.3 nm, of greater than or equal to 1.62, and
   the optical boroaluminate glass article has a density of less than or equal to 4.00 g/cm³.

2. The optical boroaluminate glass article of claim 1, wherein the optical boroaluminate glass article comprises from greater than or equal to 3.0 mol % to less than or equal to 7.5 mol % $La_2O_3$.

3. The optical boroaluminate glass article of claim 1, wherein the optical boroaluminate glass article comprises from greater than or equal to 4.0 mol % to less than or equal to 18.0 mol % $Nb_2O_5$.

4. The optical boroaluminate glass article of claim 1, wherein the optical boroaluminate glass article comprises from greater than or equal to 6.0 mol % to less than or equal to 16.0 mol % $Nb_2O_5$.

5. The optical boroaluminate glass article of claim 1, wherein the optical boroaluminate glass article comprises:
   from greater than or equal to 0.0 mol % to less than or equal to 25.0 mol % BaO;
   from greater than or equal to 0.0 mol % to less than or equal to 1.0 mol % SrO;
   from greater than or equal to 0.0 mol % to less than or equal to 1.0 mol % $SnO_2$; and
   from greater than or equal to 0.0 mol % to less than or equal to 1.0 mol % $Sb_2O_3$.

6. The optical boroaluminate glass article of claim 1, wherein the optical boroaluminate glass article comprises:
   from greater than or equal to 0.0 mol % to less than or equal to 10.0 mol % alkali metal oxides;
   a sum of MgO and SrO from greater than or equal to 0.0 mol % to less than or equal to 5.0 mol %; and
   from greater than or equal to 0.0 mol % to less than or equal to 1.0 mol % fining agents.

7. The optical boroaluminate glass article of claim 1, wherein a ratio of $CaO+BaO+SrO/Al_2O_3$, in mol %, is from greater than or equal to 1.10 to less than or equal to 2.40.

8. The optical boroaluminate glass article of claim 1, wherein a ratio of $B_2O_3/(CaO+BaO+SrO+Al_2O_3)$, in mol %, is greater than or equal to 0.15.

9. The optical boroaluminate glass article of claim 1, wherein a ratio of $B_2O_3/(CaO+BaO+SrO+Al_2O_3)$, in mol %, is greater than or equal to 0.20 to less than or equal to 0.50.

10. The optical boroaluminate glass article of claim 1, wherein the optical boroaluminate glass article has a refractive index, measured at 589.3 nm, greater than or equal to 1.69.

11. The optical boroaluminate glass article of claim 1, wherein the optical boroaluminate glass article has a refractive index, measured at 589.3 nm, from greater than or equal to 1.69 to less than or equal to 1.80.

12. The optical boroaluminate glass article of claim 1, wherein the optical boroaluminate glass article has a density from greater than or equal to 2.25 g/cm³ to less than or equal to 4.00 g/cm³.

13. The optical boroaluminate glass article of claim 1, wherein the optical boroaluminate glass article has a density from greater than or equal to 2.25 g/cm³ to less than or equal to 3.00 g/cm³.

14. The optical boroaluminate glass article of claim 1, wherein the optical boroaluminate glass article has a liquidus temperature from greater than or equal to 1000° C. to less than or equal to 1350° C.

15. The optical boroaluminate glass article of claim 1, wherein the optical boroaluminate glass article has Advanced Optics (AO) losses less than or equal to 0.040 mg/mm².

16. The optical boroaluminate glass article of claim 1, wherein the optical boroaluminate glass article has Advanced Optics (AO) losses less than or equal to 0.005 mg/mm².

17. The optical boroaluminate glass article of claim 1, wherein the optical boroaluminate glass article has Nano Strip 2X test losses of less than or equal to 0.015 mg/mm².

18. The optical boroaluminate glass article of claim 1, wherein the optical boroaluminate glass article has a glass annealing temperature from greater than or equal to 550° C. to less than or equal to 680° C.

19. The optical boroaluminate glass article of claim 1, wherein the optical boroaluminate glass article has a $T_x$-$T_g$ value from greater than or equal to 80° C. to less than or equal to 250° C.

20. The optical boroaluminate glass article of claim 1, wherein the optical boroaluminate glass article has a $T_x-T_g$ value from greater than or equal to 130° C. to less than or equal to 170° C.

* * * * *

UNITED STATES PATENT AND TRADEMARK OFFICE
CERTIFICATE OF CORRECTION

PATENT NO. : 11,247,934 B2
APPLICATION NO. : 16/243506
DATED : February 15, 2022
INVENTOR(S) : Bruce Gardiner Aitken et al.

It is certified that error appears in the above-identified patent and that said Letters Patent is hereby corrected as shown below:

On the Title Page

Item (56), in Column 2, under "Other Publications", Line 11, delete "Calsium" and insert
-- Calcium --.

Item (56), in Column 2, under "Other Publications", Line 22, delete ""Spectroscipic" and insert
-- "Spectroscopic --.

Signed and Sealed this
Third Day of May, 2022

Katherine Kelly Vidal
*Director of the United States Patent and Trademark Office*